United States Patent [19]

Wujick

[11] 4,403,979

[45] Sep. 13, 1983

[54] PULLEY FOR POSITIVE DRIVE SYSTEMS

[75] Inventor: Frank L. Wujick, Sao Paulo, Brazil

[73] Assignee: Uniroyal, Inc., New York, N.Y.

[21] Appl. No.: 268,426

[22] Filed: May 29, 1981

Related U.S. Application Data

[63] Continuation of Ser. No. 140,950, Apr. 16, 1980, abandoned, which is a continuation of Ser. No. 864,045, Dec. 23, 1977, abandoned.

[51] Int. Cl.³ .............................................. F16H 7/02
[52] U.S. Cl. ...................................... 474/153; 474/205
[58] Field of Search ............... 474/250, 237, 247, 251, 474/148–153, 168, 170, 205, 169, 174

[56] References Cited

U.S. PATENT DOCUMENTS

| | | | |
|---|---|---|---|
| 2,507,852 | 5/1950 | Case | 74/237 |
| 2,934,967 | 5/1960 | Worrall, Jr. | 474/148 |
| 2,937,538 | 5/1960 | Worrall, Jr. | 474/148 |
| 3,002,396 | 10/1961 | Worrall, Jr. | 474/148 |
| 3,173,301 | 3/1965 | Miller | 74/243 R |
| 3,260,125 | 7/1966 | Dolza | 474/148 |
| 3,404,576 | 10/1968 | Cicognani | 474/148 |
| 3,756,091 | 9/1973 | Miller | 74/231 C |
| 4,016,772 | 4/1977 | Clemens et al. | 74/243 R |
| 4,037,485 | 7/1977 | Hoback | 474/148 |
| 4,041,789 | 8/1977 | Hoback | 474/148 |
| 4,147,069 | 4/1979 | Derner | 74/231 C |
| 4,148,225 | 4/1979 | Redmond, Jr. et al. | 474/148 |

FOREIGN PATENT DOCUMENTS

| | | | |
|---|---|---|---|
| 1312164 | 4/1973 | United Kingdom | 74/231 C |

*Primary Examiner*—Leslie A. Braun
*Assistant Examiner*—Andrew Joseph Rudy
*Attorney, Agent, or Firm*—Henry Sternberg

[57] ABSTRACT

A pulley configuration which increases the contact area between the pulley tooth tips and the land area of the belt teeth. The increased contact area reduces land area wear between belt teeth. The pulley tooth tip has a longitudinal cross-sectional contour partially composed of two substantially circular arcs connected by a line segment which is substantially straight or slightly curved. The length of the line segment is from 5 percent to 100 percent of the width of the belt tooth on which the pulley is used, and preferably between 6 percent and 33 percent of the width of the belt tooth. The pulley in combination with a toothed belt forms a positive power transmission system.

13 Claims, 4 Drawing Figures

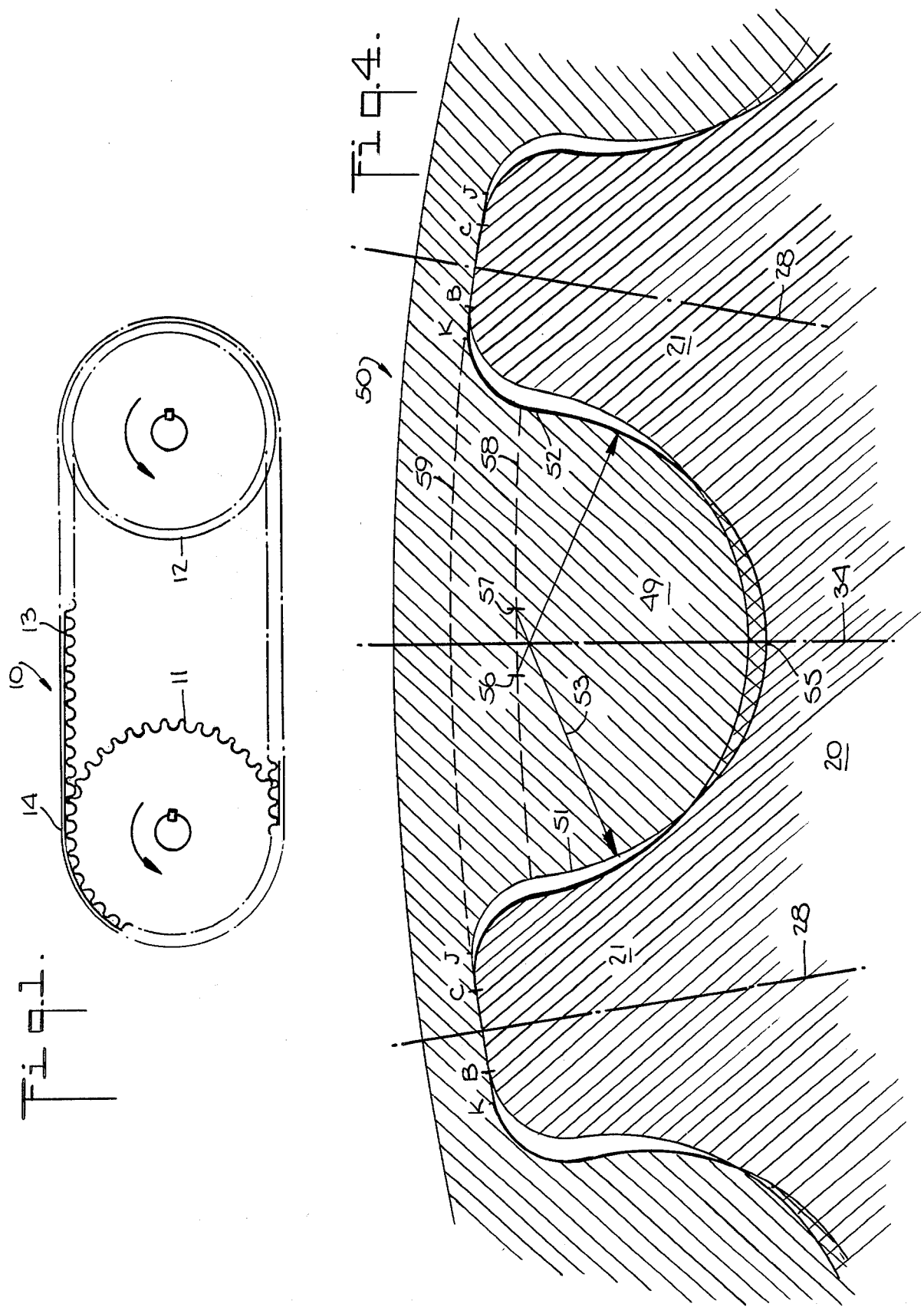

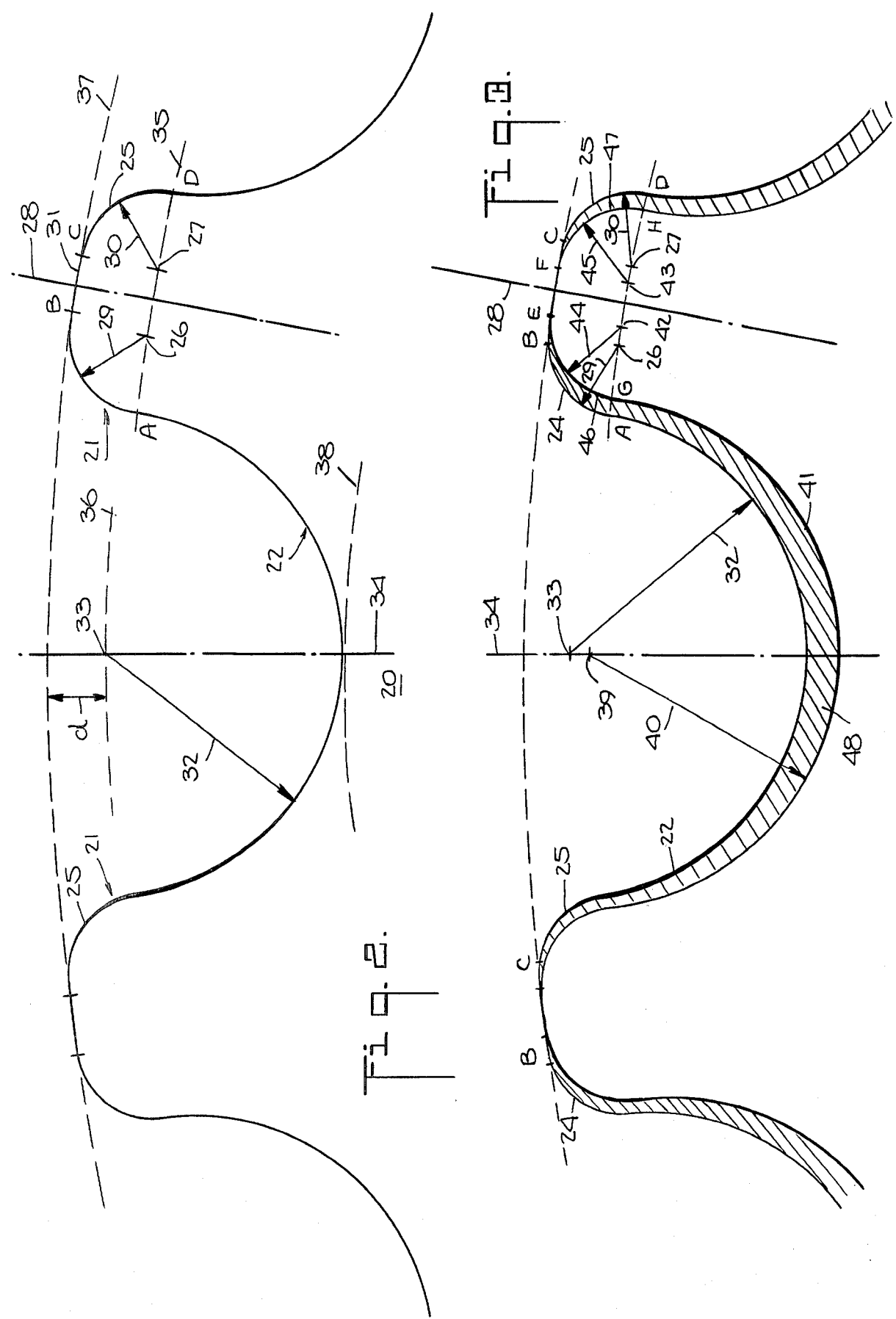

PULLEY FOR POSITIVE DRIVE SYSTEMS

This is a continuation of application Ser. No. 140,950, filed Apr. 16, 1980, now abandoned which was a continuation of Ser. No. 864,045 filed Dec. 23, 1977 now abandoned.

BACKGROUND OF THE INVENTION

This invention relates to a toothed power transmission belt and pulley drive.

U.S. Pat. No. 2,507,852, to R. Y. Case, describes a power transmission belt comprising an inextensible tensile member having teeth bonded to one side and a protective jacket fabric covering the teeth. The teeth are preferably made of an elastomeric material, such as rubber, and the belt may also include a backing layer of identical or similar material to that which the teeth are constructed.

Many different elastomeric materials have been utilized for the construction of belts made in accordance with the Case patent, some of the more common materials being neoprene and polyurethane. These belts are designed to mesh with toothed pulleys that are constructed of a material having a higher Young's modulus than the elastomeric material used for the construction of the belt. The conventional toothed belt, as described in the Case patent, utilizes a tooth cross-sectional configuration that is essentially trapezoidal and which is very similar to a conventional rack tooth. Many attempts have been made to alter the belt and pulley teeth configurations to relieve the problem of belt failure. In such trapezoidal tooth belts, the common failure is that of tooth shear due to stress concentration. In seeking to reduce tooth shear, U.S. Pat. No. 3,756,091 to H. Miller, discloses belt teeth having a cross-sectional configuration which approximates the contour of the one-half order isochromatic fringe in a belt tooth under a defined rated load. The pulley grooves in accordance with the Miller patent are in mating engagement with and are substantially conjugate to the belt teeth. The belt having substantially curvilinear teeth in accordance with the Miller patent reduced belt tooth shear and increased horsepower capacity. One mode of failure in the belt configuration according to Miller may occur because of land wear in the belt, especially with small diameter pulleys. Land wear between the belt teeth is due to abrasion of the protective layer and exposure of the tensile member by action of the pulley tooth against the belt. This land wear leads to premature failure due to a detachment of the teeth from the tensile member and/or a break in the tensile member.

U.S. Pat. No. 4,037,485, to Hoback, proposes a solution to the land wear problem. As disclosed in the Hoback patent, the dimensional relationship of the belt teeth and grooves and the pulley teeth and grooves is such that in the longitudinal extent of the belt between the pulleys, the height of the belt teeth is greater than the depth of the pulley grooves while as the belt travels around the pulleys, the extreme outwardly facing portions of the belt teeth which confront the pulleys comes into contact with the portions of the toothed pulley which define the bottom of the pulley grooves. At the same time, Hoback discloses that the belt teeth are compressed to reduce their height so that the extreme radially outwardly facing portions of the pulley teeth come into contact with the portions of the belt disposed between the belt teeth which define the bottoms of the belt grooves.

Relatively early in the operating life of the toothed power transmission belt and pulley as disclosed in Hoback, the compressive engagement of the elastomeric teeth against the bottom of the pulley groove results in a substantially permanent deformation of the belt tooth. This deformation is accelerated at elevated operating temperatures such as occur in automotive applications. The deformation results in a significant permanent decrease in the tooth height. The deformed teeth no longer support the tensile member as desired by Hoback. Subsequently the same wear pattern develops in the toothed belt and pulley drive according to Hoback as in the toothed power transmission configuration according to the Miller patent.

SUMMARY OF THE INVENTION

It has been found in accordance with the present invention that the land wear problem of the Miller and Hoback patents can be substantially reduced. The reduction results in an increase in the operating life of the toothed belt. Furthermore, in accordance with the present invention the toothed power transmission drive has improved belt life, even under severe operating conditions such as elevated temperature and torsional vibration environments. The improvement is most beneficial with small pulleys.

The present invention is a pulley for use in conjunction with a flexible drive belt, such as disclosed in Miller.

As used herein, the terms describing the features of the present invention are defined in the patent to Miller.

The present invention reduces the problem of land area wear between belt teeth by changing the pulley configuration to increase the contact area between the pulley tooth tips and the land area of the belt teeth. It further relieves the pressure in the belt tooth land area by providing support for the belt tooth in the pulley groove. The pulley of the present invention is a non-conjugate form of the belt. Each of the pulley grooves is formed by a substantially circular arc connecting the tips of adjacent pulley teeth. The belt teeth, as the belt travels around the pulley, is in compressive engagement with the pulley groove. Each of the pulley tooth tips has a longitudinal cross-sectional contour generally as disclosed in Miller and is partially composed of two substantially circular arcs having centers of curvature displaced from each other. The centers of curvature are each located on the same side of the tooth tip as its respective arc. The tooth tip arcs are connected by a line segment which is substantially straight or slightly curved. The line segment defines the pulley tooth tip width. In accordance with the present invention, the surface contact ratio of the belt tooth width to the line segment is between 20:1 and 1:1. The length of this line segment is from 5% to 100% of the width of the belt tooth on the belt with which the pulley is to be used, and preferably between 6% and 33% of the width of the belt tooth.

Both the compressive engagement of the belt tooth with the pulley groove and the surface contact ratio as defined, do act individually to reduce land wear in the belt. However, in combination, as more fully described herein, they reduce land wear in the belt to an extent greater than the sum of their individual effects.

BRIEF DESCRIPTION OF THE DRAWINGS

The invention will be more clearly understood from the following description read together with the drawing in which:

FIG. 1 is a longitudinal cross-sectional view looking transversely of the preferred embodiment of the cooperating pulleys in accordance with the present invention in engagement with a belt to form a positive drive system;

FIG. 2 is an enlarged fragmentary longitudinal cross-sectional view of the pulley in accordance with the preferred embodiment;

FIG. 3 is an enlarged fragmentary longitudinal cross-sectional view of the pulley of FIG. 2 superimposed on a view of a corresponding conjugate pulley according to the Miller patent; and FIG. 4 is an enlarged fragmentary longitudinal cross-sectional view of the pulley of FIG. 2 in mating engagement with a belt constructed in accordance with the Miller patent under a no-load condition.

DETAILED DESCRIPTION OF THE INVENTION

As seen in FIG. 1, the endless belt 10 engages the driving and driven pulleys 11 and 12. Belt 10 is provided with a tensile member 13 comprising a plurality of turns of a continuous strand of filamentary material. The tensile member 13 carries substantially the entire working load imposed on the belt 10, and up to the maximum load for which the belt is designed, the tensile member 13 is substantially inextensible. The above cited Case and Miller patents may be consulted for a more detailed description of the principles of this general class of toothed belt and pulley system. The entire contents of the Case and Miller patents are each incorporated herein by reference. The belt further includes a backing layer 14 and a protective jacket (not shown) extending over the entire toothed surface of the belt. A thin layer of elastomeric or other material (not shown) between the jacket and the tensile member 13 may be added to improve adhesion in the land areas of the belt. The belt may be made in any one of a number of ways, but it is preferable to use the method described in U.S. Pat. No. 3,078,206 to W. Skura, the entire contents of which are incorporated herein by reference. An alternative method for manufacture is described in the above cited Case patent.

The pulleys 11 and 12 of FIG. 1 as seen in FIG. 2 each comprise a body portion 20 having curvilinear teeth 21 separated by curvilinear cavities 22. The tooth tip 23 viewed in longitudinal cross-section has an outer configuration which is composed of two circular arcs 24 and 25 having displaced centers of curvature 26 and 27 displaced from a tooth tip center line 28. Arcs 24 and 25 have two equal radii 29 and 30 with centers of curvature 26 and 27 displaced equal amounts on opposite side of the center line 28 of the tooth 21 but on the same side as their corresponding arcs. Both centers of curvature are within the pulley tooth. The non-intersecting arcs 24 and 25 are connected by a line segment 31. The arc 24 extends from point A to point B. The arc 25 extends from point C to point D. The centers 26 and 27 lie at equal distances from a tangent to the outside diameter of the pulley at the center line 28 of the tooth, lie at equal distances to opposite sides of the center line 28 and lie at equal radial distances from the center of the pulley. The line segment 31 is part of an arc of a circle having a radius drawn from a center lying on the extension of the center line 28. The center of curvature of line 31 may lie on center line 28, i.e. within the body of the pulley. Alternatively the center of curvature of line segment 31 may lie on an extension of center line 28 which is outside the body of the pulley. The line segment 31 is shown as being a straight line, but may be concave or convex with respect to the body of the pulley.

FIG. 3 shows an enlarged fragmentary longitudinal cross-section view of the pulley of FIG. 2 superimposed on a view of a corresponding conjugate pulley according to the Miller patent. This figure emphasizes the difference in the longitudinal cross-sectional profiles of the respective pulley grooves and teeth. FIG. 3 shows the cavity 22 of this invention which is formed by the arc of radius 32 at a center of curvature 33. The arcs 24 and 25 which partially form the pulley tooth tip of this invention are generated by respective radii 29 and 30 having centers of curvature at 26 and 27. The line segment forming the outermost portion of the tooth tip and connecting the arcs 24 and 25, according to the invention, has a length equal to the distance between points B and C. The arc forming the cavity 22 may intersect with the arcs 24 and 25 of this invention at points A and D.

In contrast, the conjugate pulley according to the Miller patent, has a cavity 41 formed by arc having a radius 40 and a center of curvature 39. The arcs 46 and 47 which partially form the pulley tooth tip according to the Miller patent are generated by respective radii 44 and 45 having centers of curvature at 42 and 43. The line segment forming the outermost portion of the tooth tip and connecting the arcs 46 and 47 has a length equal to the distance between points E and F. The arc forming the cavity 41 intersects the arcs 46 and 47 at points G and H.

The length of the line segment BC of the present invention is greater than the length of the line segment EF of the pulley tooth tip according to the Miller patent. The centers of curvature 26 and 27 of the present invention are displaced on opposite sides of the center line 28, a distance greater than the displacement of the centers of curvature 42 and 43 of the pulley tooth tip according to the Miller patent. The cross-hatched area 48 represents the additional material present in the pulley groove and tooth tip profile according to this invention as compared to the same profile according to the Miller patent.

FIG. 4. is an enlarged fragmentary longitudinal cross-sectional view of the pulley of FIG. 2 in mating engagement with a belt constructed in accordance with the Miller patent under a no-load condition. In longitudinal cross-section, each tooth 49 of the belt 50 is composed to two circular arcs 51 and 52 of equal radius 53 and 54 intersecting at a point 55 on the center line 34. The centers of curvature 56 and 57 from which the arcs 51 and 52 are drawn are located on a line 58 as shown in the Miller patent. The extent of the arcs 51 and 52 is such that they extend to the line 58. The centers of curvature 56 and 57 for the arcs 51 and 52 are displaced on opposite sides of the center line 34 from their corresponding arcs by an amount that is generally equal to or less than 10% of the radius of curvature of the arcs 51 and 52.

The depth of the groove between adjacent pulley teeth in the pulley of the invention is less than the depth of the groove in the conjugate pulley, and is thus less than the depth of a tooth of the belt. This is shown clearly in FIG. 4, where the tip of the belt tooth is shown as overlapping the base of the pulley groove. Obviously this will not happen in practice and the belt tooth will be distorted due to contact with the pulley groove. It is preferred that the pulley groove depth be between 1% and 15% less than the belt tooth depth.

In designing a drive according to the invention, in addition to the criteria already described, it is desirable that the surface contact ratio of belt tooth width (the width represented by the length of broken line 59 between the points J and K in FIG. 4) to the length of the line segment 31 (the width represented by the length of the line BC in FIG. 2) be between 20:1 and 1:1 and desirably between 15:1 and 3:1.

The cross-sectional configuration of cavity 22 has a radius 32 much larger than radii 29 and 30 and has a center 33 which is outside the pulley body and is on a center line 34. The centers of radii 26, 27 and 33 are located on the same or slightly spaced circles 35 and 36 which are concentric with and within a circle connecting the outermost line segments 31 of the tooth tips. The circles 35 and 36 are spaced radially inwardly from this circle a distance equal to or less than 30 percent of the total tooth depth. The total tooth depth is the radial distance between the intersection of line segment 31 and center line 28, i.e. a point on the addendum 37 and a circle connecting the innermost points of cavity 22. The innermost point of cavity 22 is at the intersection of the arc generated by the radius 32 and the center line 34, i.e. a point on the dedendum 38.

The cavity 22 is formed by an arc of a circle having a radius 32 drawn from a center 33 on center line 34. The arc forming cavity 22 may intersect the arc 24 on one side of the overall pulley groove profile and intersect arc 25 on the other side of the profile. The profile of the pulley groove from the intersection of line segment 31 and center line 28 to a corresponding intersection of the next adjacent tooth is repeated around the circumference of the pulley to define the other teeth and grooves.

The total depth of the pulley groove is equal to the distance measured along center line 34 between the intersections of line 34 and the addendum 37 and the dedendum 38. As shown in FIG. 2, the total depth of the pulley groove is the sum of the length of the radius 32 and the distance d. Preferably the total depth of the pulley groove is not more than 15% less than the depth of the belt tooth which engages with the pulley groove. Consequently the belt tooth may be in compressive engagement with the cavity 22. Alternatively the dimensional relationship between the pulley groove depth and the depth of the belt tooth may be as described in the patent to Miller.

In designing the pulley groove and tooth form, it is desirable that the arc forming the cavity 22 smoothly intersect with the arcs 24 and 25. However, in order to provide a smooth transition from the arc forming the cavity 22 to the arcs 24 or 25 forming a portion of the pulley tooth tip, it may be desirable to provide a connecting line. This connecting line may be similar to line segment 31.

EXAMPLE

In order to compare the performance of power transmission systems having pulleys with the novel dimensional relationship of this invention with those having conventional dimensional relationships, the following procedure was followed. Several positive or synchronous drive belt samples were manufactured by conventional methods using conventional materials well known in the art. All the belts were formed of a neoprene rubber composition having a nylon fabric facing on the belt teeth, and including a tensile member of fiber glass cords disposed substantially on the dedendum line of the belt teeth. The belt samples after manufacture were dynamically tested on toothed pulleys of appropriate dimension and configuration as will be hereinafter described.

Three power transmission systems were tested. These combinations are identified as A, B and C:

Combination A comprises belts and pulleys manufactured strictly in accordance with the Miller patent. These belts and pulleys are sold commercially by UNIROYAL, Inc. as its 8 mm. pitch Powergrip HTD® Belt and Pulley system.

The eighteen belt samples produced had the following dimensions as measured in the longitudinal extent of the belt between the pulleys: a pitch between belt teeth of 0.315 inches; a belt tooth width of 0.260 inches; a distance between the belt teeth of 0.055 inches; and a belt tooth depth of 0.135 inches. The belts were 15 mm. wide and 936 mm. in pitch length.

The pulleys had a tooth depth of 0.142 inches and were substantially conjugate to the belt teeth. As taught in the Miller patent, the tooth tips had a longitudinal cross-sectional contour composed of two circular arcs connected by a line segment. The line segment length was 0.011 inches. In the resulting power transmission system the line segment is 4.2% of the width of the belt tooth.

Combination B comprises a power transmission system exactly as found in Combination A except that the belt tooth depth had been increased by 0.012 inches (8.9%) to 0.147 inches. This corresponds to the teachings in U.S. Pat. No. 4,037,485 to Hoback. Seven belt samples were made.

Combination C comprises a power transmission system in accordance with the present invention. The belt has the same dimensions as the belt in Combination A. The pulley tooth had a depth of 0.130 inches; the pulley cavity had a radius of curvature of 0.106 inches. The line segment length was 0.020 inches.

Table I is a comparison of the key dimensions of Combinations A, B and C and the resulting compression of the belt teeth.

TABLE I

| | Combinations | | |
|---|---|---|---|
| | A | B | C |
| Belt Tooth Width | .260 | .260 | .260 |
| Belt Tooth Depth | .135 | .147 | .135 |
| Pulley Tooth Depth | .142 | .142 | .130 |
| Line Segment Length | .011 | .011 | .020 |
| Line Segment Length (as percentage of belt tooth width) | 4.2% | 4.2% | 7.7% |
| Percent Belt Tooth Compression | 0% | 3.4% | 3.7% |

$$\frac{(\text{Belt Tooth Depth} - \text{Pulley Tooth Depth})}{\text{Pulley Tooth Depth}}$$

Each belt sample was mounted on a dead weight flex tester having a two pulley arrangement consisting of a driver and a driven pulley each having an outside diameter of 2.160 inches. The driver pulley was operated at 350 rpm with a force between pulley shaft centers of 250 lbs. The test was conducted at ambient temperature. The belts were tested to failure unless otherwise indicated. The lapsed time to the nearest hour of each group of belt samples to failure is shown in Table II.

TABLE II

| Life on Test, Hours | | | |
|---|---|---|---|
| A | B | C | |
| 83.4 | 59.0 | 298.4 | (test suspended) |
| 46.9 | 117.2 | 690.7 | |
| 65.5 | 99.1 | 187.6 | |
| 75.7 | 120.8 | 233.4 | |
| 54.2 | | 258.5 | |
| Average 65.1 | 99.0 | 345.1 | |

The test was repeated in an environmental chamber held at 190° F. The results are shown in Table III.

TABLE III

| Life on Test, Hours | | |
|---|---|---|
| A | B | C |
| 93.0 | 118.2 | 196.2 |
| 87.9 | 98.5 | 105.7 |
| 82.0 | 117.5 | 129.3 |
| 103.4 | | 171.8 |
| Average 91.6 | 111.4 | 162.0 |

The results in Tables II and III clearly show that the pulley-belt Combination C having the pulley to belt relationship of this invention provides a significantly improved belt life over Combinations A and B. This improvement was shown on the tests made at ambient temperature and on the tests made on accelerated tests at 190 deg. F.

The only significant variable in the comparative tests was the relationship of the pulley dimensions to the belt dimensions. Combination B had belt teeth that were greater in depth than the depth of the corresponding pulley grooves. Combination C also had belt teeth that were greater in depth than the depth of the corresponding pulley grooves. However, the line segment length of the Combination C pulleys was substantially greater than that of the line segment lengths of the Combination A or the Combination B pulleys. The pulley of the prior arc Combinations A and B had inadequate line segment lengths causing the belt to be subjected to excess stress on the tensile members. This excess stress caused abrasion of the belt between the belt teeth and the failure resulted primarily from excessive wear in this area.

In the pulleys of Combination C, the line segment length was of sufficient length to distribute the load over a larger area and thus reduce the stress in the area between the belt teeth. Consequently, wear in the area of the belt between the teeth was reduced, and the belt life was significantly increased at both ambient and elevated temperatures.

The pulley described herein may be used in combination with toothed belts other than that disclosed in the patents to Case, Miller and Hoback. The longitudinal cross-sectional contour of the individual belt teeth may be trapezoidal, curvilinear or wedge-shaped or a combination or a modification of these contours. The belt may also have teeth on both sides of the tensile member.

While there has been described what is at present considered to be preferred embodiments of this invention, it will be obvious to those skilled in the art that various changes and modifications may be made therein without departing from the spirit of the invention, and it is, therefore, aimed to cover all such changes and modifications as fall within the scope and spirit of this invention.

What is claimed is:
1. A power transmission system consisting of at least one small diameter toothed pulley in combination with a flexible toothed belt having belt teeth of cross-sectional contour substantially composed of two substantially circular arcs defining substantially curved belt tooth tips, the pulley teeth being composed of tip portions connected by cavity portions, each tip portion having a longitudinal cross-sectional contour partially composed of two substantially circular arcs, said arcs having centers of curvature displaced from each other, the center of curvature of each arc being located on the same side of the center line of said tip portion as its respective arc, the outermost portion of each tooth tip joining the two arcs forming a line segment, the length of the line segment being from 6% to 33% of the width of the belt teeth, and the distance between the outermost portion of the pulley teeth cavities and the innermost portion of the pulley teeth cavities being less than the depth of the belt teeth which are not in contact with the pulley.
2. The power transmission system of claim 1, wherein said pulley teeth line segments are circular arcs.
3. The power transmission system of claim 1, wherein said pulley teeth arcs are tangent to their respective line segments at their points of intersection.
4. The power transmission system of claim 1, wherein said pulley teeth line segments are straight lines.
5. The power transmission system of claim 1, wherein the longitudinal cross-sectional contours of the pulley teeth cavities are composed of substantially circular arcs.
6. The power transmission system of claim 1, wherein the belt teeth in contact with the pulley are in compressive engagement with some of the pulley teeth cavities.
7. The power transmission system of claim 6, wherein the pulley teeth cavities are non-conjugate with the belt teeth.
8. The power transmission system of claim 6, wherein the pulley teeth line segments are circular arcs.
9. The power transmission system of claim 6, wherein said arcs partially forming the contours of the pulley teeth are tangent to the line segments at their points of intersection.
10. The power transmission system of claim 6, wherein the pulley teeth line segments are straight lines.
11. The power transmission system of claim 6, wherein the longitudinal cross-sectional contours of the pulley teeth cavities are composed of substantially circular arcs.
12. A power transmission system comprising at least one pulley with teeth in combination with a flexible belt with teeth, the pulley teeth being a non-conjugate form of the belt teeth, the pulley teeth being separated by pulley cavity portions and the belt teeth being separated by belt cavity portions, each pulley tooth in longitudinal cross-section being symmetrical about a pulley tooth centerline intersecting with a center of said pulley, said pulley tooth including a pulley tip portion and opposite pulley flank portions extending from said pulley tip portion, the pulley tip portion being defined by first and second circular arcs on opposite sides of said pulley tooth centerline, the centers of curvature of said first and second arcs being displaced from each other on a circular arc having a common center with said pulley, a peripheral pulley segment at the outermost portion of said pulley tooth tip joining the first and second arcs, each said pulley cavity being symmetrical about a pul- ley cavity centerline intersecting with the center of said pulley, said pulley cavity being partially defined by a third circular arc having a center of curvature on the pulley cavity centerline, said third circular arc defining a base portion of said pulley cavity and extending from said pulley cavity base portion into the flank portions of adjacent pulley teeth, portions of said first and second arcs extending from the tip portion of said pulley tooth toward the respective flank portions of said pulley tooth, each belt tooth in longitudinal cross-section being symmetrical about a belt tooth centerline, said belt tooth including a substantially curved belt tip portion partially defined by fourth and fifth circular arcs extending into opposite flank portions of said belt tooth, said belt cavity being symmetrical about a belt cavity centerline and being partially defined by the fourth arc of one belt tooth and the fifth arc of an adjacent belt tooth, said belt cavity having a base portion exceeding the width of said pulley tooth tip, and the center of curvature locations and the radii of said third, fourth and fifth circular arcs being selected such that in a no-load condition of the belt and the pulley, the height of said belt tooth along said belt tooth centerline measuring from the belt tooth tip to the intersection of said belt tooth centerline with a line tangent to consecutive belt tooth cavities exceeds the depth of said pulley cavity along said pulley cavity centerline measuring from the intersection of said third arc with said pulley cavity centerline to the intersection of said pulley cavity centerline with an arc having a common center with said pulley and tangent to consecutive pulley teeth tips.

13. In a power transmission system including at least one pulley with teeth in combination with a flexible belt with teeth wherein the belt teeth are separated by belt cavity portions, and each belt tooth in longitudinal cross-section is symmetrical about a belt tooth centerline, with each belt tooth including a substantially curved belt tip portion partially defined by first and second circular arcs extending into opposite flank portions of said belt tooth, wherein the belt cavity is symmetrical about a belt cavity centerline and is partially defined by the first arc of one belt tooth and the second arc of an adjacent belt tooth, and wherein the belt cavity has a base portion, the pulley comprising pulley teeth that are a non-conjugate form of the belt teeth, the pulley teeth being separated by pulley cavity portions and each pulley tooth in longitudinal cross-section being symmetrical about a pulley tooth centerline intersecting with a center of said pulley, said pulley tooth including a pulley tip portion having a width less than the width of the belt cavity base portion, and opposite pulley flank portions extending from said pulley tip portion, the pulley tip portion being defined by third and fourth circular arcs on opposite sides of said pulley tooth centerline, the centers of curvature of said third and fourth arcs being displaced from each other on a circular arc having a common center with said pulley, a peripheral pulley segment at the outermost portion of said pulley tooth tip joining the third and fourth arcs, each said pulley cavity being symmetrical about a pulley cavity centerline intersecting with the center of said pulley, said pulley cavity being partially defined by a fifth circular arc having a center of curvature on the pulley cavity centerline, said fifth circular arc defining a base portion of said pulley cavity and extending from said pulley cavity base portion into the flank portions of adjacent pulley teeth, portions of said third and fourth arcs extending from the tip portion of said pulley tooth toward the respective flank portions of said pulley tooth, the center of curvature location and the radii of said fifth circular arc being selected such that in a no-load condition the depth of said pulley cavity along said pulley cavity centerline measuring from the intersection of said fifth arc with said pulley cavity centerline to the intersection of said pulley cavity centerline with an arc having a common center with said pulley and tangent to consecutive pulley teeth tips is less than the height of said belt tooth along said belt tooth centerline measuring from the belt tooth tip to the intersection of said belt tooth centerline with a line tangent to consecutive belt tooth cavities.

* * * * *